US 7,299,250 B2

(12) United States Patent
Douceur et al.

(10) Patent No.: US 7,299,250 B2
(45) Date of Patent: *Nov. 20, 2007

(54) FILE AVAILABILITY IN DISTRIBUTED FILE STORAGE SYSTEMS

(75) Inventors: John R. Douceur, Bellevue, WA (US); Roger P. Wattenhofer, Zurich (CH)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/275,655

(22) Filed: Jan. 20, 2006

(65) Prior Publication Data

US 2006/0106882 A1    May 18, 2006

Related U.S. Application Data

(63) Continuation of application No. 10/092,994, filed on Mar. 7, 2002, now Pat. No. 7,020,665.

(51) Int. Cl.
*G06F 17/30* (2006.01)
(52) U.S. Cl. ............ 707/204; 707/205; 707/202; 707/203
(58) Field of Classification Search ........ 707/200–205; 709/206; 714/4
See application file for complete search history.

(56) References Cited

U.S. PATENT DOCUMENTS

| | | | |
|---|---|---|---|
| 5,317,728 A | 5/1994 | Tevis et al. | |
| 5,371,794 A | 12/1994 | Diffie et al. | |
| 5,452,447 A | 9/1995 | Nelson et al. | |
| 5,588,147 A | 12/1996 | Neeman et al. | |
| 5,758,359 A | 5/1998 | Saxon | |
| 5,778,395 A | 7/1998 | Whiting et al. | |
| 5,812,776 A | 9/1998 | Gifford | |
| 5,873,085 A | 2/1999 | Enoki et al. | |
| 5,901,227 A | 5/1999 | Perlman | |
| 5,907,673 A | 5/1999 | Hirayama et al. | |
| 5,909,540 A | 6/1999 | Carter et al. | |
| 5,915,096 A | 6/1999 | Rosenzweig et al. | |
| 5,950,198 A | 9/1999 | Falls et al. | |
| 5,991,414 A | 11/1999 | Garay et al. | |
| 5,991,771 A * | 11/1999 | Falls et al. | .......... 707/202 |
| 6,026,474 A | 2/2000 | Carter et al. | |
| 6,067,545 A | 5/2000 | Wolff | |
| 6,098,079 A | 8/2000 | Howard | |
| 6,160,552 A | 12/2000 | Wilsher et al. | |
| 6,167,449 A | 12/2000 | Arnold et al. | |

(Continued)

OTHER PUBLICATIONS

"Towards an Archival Intememory" IEEE International forum on Research and Technology Advances in Digital Libraries pp. 147-156 Apr. 1998.

(Continued)

*Primary Examiner*—Cam Y T Truong

(57) ABSTRACT

File availability in distributed file storage systems is improved by initially placing replicas of a file or other object on different ones of multiple devices using a first process. Subsequently, the placement of the replicas is improved by evaluating whether any replicas of a first file can be swapped with any replicas of a second file without a reduction in the combined file availability of the first and second files, and swapping a replica of the first file with a replica of the second file if the swapping results in no reduction in the combined file availability of the first and second files.

12 Claims, 7 Drawing Sheets

U.S. PATENT DOCUMENTS

| | | | |
|---|---|---|---|
| 6,185,574 B1 | 2/2001 | Howard et al. | |
| 6,208,659 B1 | 3/2001 | Govindarajan et al. | |
| 6,233,606 B1 | 5/2001 | Dujari | |
| 6,263,348 B1 | 7/2001 | Kathrow et al. | |
| 6,269,080 B1 | 7/2001 | Kumar | |
| 6,295,538 B1 | 9/2001 | Cooper et al. | |
| 6,324,544 B1 | 11/2001 | Alam et al. | |
| 6,345,288 B1 | 2/2002 | Reed et al. | |
| 6,370,547 B1 | 4/2002 | Eftink | |
| 6,389,433 B1 | 5/2002 | Bolosky et al. | |
| 6,405,315 B1 | 6/2002 | Burns et al. | |
| 6,415,372 B1* | 7/2002 | Zakai et al. | 711/165 |
| 6,463,535 B1 | 10/2002 | Drews | |
| 6,466,978 B1* | 10/2002 | Mukherjee et al. | 709/225 |
| 6,477,544 B1 | 11/2002 | Bolosky et al. | |
| 6,484,204 B1 | 11/2002 | Rabinovich | |
| 6,493,804 B1 | 12/2002 | Soltis et al. | |
| 6,510,426 B1 | 1/2003 | Cohen et al. | |
| 6,516,350 B1* | 2/2003 | Lumelsky et al. | 709/226 |
| 6,522,423 B2 | 2/2003 | Cohen et al. | |
| 6,535,894 B1 | 3/2003 | Schmidt et al. | |
| 6,556,998 B1 | 4/2003 | Mukherjee et al. | |
| 6,560,706 B1 | 5/2003 | Carbajal et al. | |
| 6,577,734 B1 | 6/2003 | Etzel et al. | |
| 6,604,170 B1 | 8/2003 | Suzuki | |
| 6,671,821 B1 | 12/2003 | Castro et al. | |
| 6,704,730 B2 | 3/2004 | Moulton et al. | |
| 6,718,360 B1 | 4/2004 | Jones et al. | |
| 6,721,880 B1 | 4/2004 | Pike | |
| 6,725,373 B2 | 4/2004 | Carbajal et al. | |
| 6,738,797 B1 | 5/2004 | Martin | |
| 6,742,114 B1 | 5/2004 | Carter et al. | |
| 6,748,538 B1 | 6/2004 | Chan et al. | |
| 6,766,367 B1 | 7/2004 | Stevenson et al. | |
| 6,788,769 B1 | 9/2004 | Waites | |
| 7,000,141 B1* | 2/2006 | Karlsson et al. | 714/4 |
| 7,051,028 B2 | 5/2006 | Shi et al. | |
| 7,096,493 B1 | 8/2006 | Liu | |
| 7,200,618 B2 | 4/2007 | Douceur et al. | |
| 2001/0039548 A1 | 11/2001 | Shinkai et al. | |
| 2002/0016174 A1 | 2/2002 | Gibson et al. | |
| 2002/0073082 A1* | 6/2002 | Duvillier et al. | 707/3 |
| 2002/0088011 A1 | 7/2002 | Lamkin et al. | |
| 2002/0095590 A1 | 7/2002 | Douceur et al. | |
| 2002/0099784 A1 | 7/2002 | Tran | |
| 2002/0103818 A1 | 8/2002 | Amberden | |
| 2002/0111996 A1 | 8/2002 | Jones et al. | |
| 2003/0046533 A1 | 3/2003 | Olkin et al. | |
| 2003/0135586 A1 | 7/2003 | Minborg et al. | |
| 2004/0068652 A1 | 4/2004 | Carpentier et al. | |

OTHER PUBLICATIONS

"Scalability in the XFS File System" USENIX Annual Technical Conference 15 pages 1998.
Borg. Digital Signatures Keep Cyberstreets Safe for Shoppers, Computer Technology Review, vol. 16, No. 2, Feb. 1996 p. 1.
"Accessing Nearby Copies of Replicated Objects in a Distributed Environment" Theory of Computing Systems pp. 32:241-280 1999.
"Accessing Nearby Copies of Replicated Objects in a Distributed Environment" Proceedins of the 9th Annual ACM Symposium on Parallel Algorithms and Architectures pp. 311-320 1997.
"Franipani: A Scalable Distributed File System" 16th ACM Symposium on Operating Systems Principles pp. 224-237 1997.
Decentralizing a Global Naming Serifce for Improved Performance and Fault Tolerance May 1989 pp. 147-183.
"Separating Key Management from File System Security" 17th ACM Symposium on Operating Systems Principles pp. 124-4139 Dec. 1999.
"Computing Replica Placement in Distributed Systems" IEEE Second Workshop on Replicated Data pp. 58-61 Nov. 1992.
David R Cheriton and Timothy P. Mann, Decentralizing a Global Naming Service for Improved Performance and Fault Tolerance, (1989) pp. 147-183.
"Free Riding on Gnutella" Xerox PARC Technical Report pp. 1-22 Aug. 2000.
"Petal: Distributed Virtual Disks" Seventh International Conference on Architectural Support for Programming Languages and Operating Systems' pp. 84-92 Oct. 1996.
FTFS: The Design of a Fault Tolerant Distributed File-System May 2000 pp. 1-49.
Federal Information Processing Standards Publication 186: Digital Signature Standard (DSS). 1994.
Experience of Adaptive Replication In Distributed File Systems' 22nd IEEE EUROMICRO 10 pages Sep. 1996.
Hu, Some Thoughts on Agent Trust and Delegation, Available at http://www.cs.nccu.edu.tw/jong, 2001, pp. 489-496.
"Freenet: A Distributed Anonymous Information Storage and Retrieval System" ICSI Workshop on Design Issues in Anonymity and Unobservability 21 pages Jul. 2000.
"Survivable Information Storage Systems" IEEE Computer pp. 33(8):61-68 Aug. 2000.
"A Large-Scale Study of File-System Contents" SIGMETRICS pp. 59-70 May 1999.
"Scale and Performance in a Distributed File System" ACM Transactions on Computer Systems pp. 51-81 Feb. 1988.
"Disconnected Operation in the Coda File System" ACM Transactions on Computer Systems V 10 N 1 pp. 3-25 Feb. 1992.
"OceanStore: An Architecture for Global-Scale Persistent Storage" Proceedings of the Ninth International Conference on Architectural Support for Programming Languages and Operating Systems 12 pages Nov. 2000.
"The Protection of Information in Computer Systems". Proceedings of the IEEE 63(9) pp. 1278-1308 Sep. 1975.
"Summary Cache: A Scalable Wide-Area Web Cache Sharing Protocol" ACM SIGCOMM pp. 254-265 1998.
"Proactive Recovery in a Byznatine-Fault-Tolerant System" 4th Symposium on Operating Systems Design and Implmentation pp. 273-287 Oct. 2000.
"Practical Byzantine Fauyt Tolerence" Proceedings of the Third Symposium on Operating Systems Design and Implementation 14 pages Feb. 1999.
"A Fast File System for Unix" ACM Transactions on Computer Sytems V 2 N 3 pp. 181-197 Aug. 1984.
Matt Evans, FTFS: The Design of A Fault Tolerant Distrubted File-System, (2000), pp. 1-49.
"The Eternity Service" Prago-Crypt pp. 242-252 Oct. 1996.
"Design and Implementation of the Sun Network Filesystem" Summer USENIX Conference pp. 119-130 Jun. 1985.
"S.M.A.R.T. Phase-II" No. WP-9803-001 Maxtor Corporation 3 pages Feb. 1998.
Serverless Network File Systems 15th Symposium on Operating Systems Principles pp. 109-126 Dec. 1995.
The OceanStore Project web pages http://ocenstore.cs.berkeley.edu/info/overview.html 2 pages last modified Jul. 8, 2002.
ISU: http://www.isu.edu/departments/comcom/unix/workshop/shell.html, Dec. 25, 2004.
From the Internet: http://www.isu.edu/departments/comcom/unix.workshop/, retrieved Sep. 28, 2005.
"Single Instance Storage in Windows 2000" Proceedings of the 4th USENIX Windows Systems Symposium pp. 13-24 Aug. 2000.
"Feasibility of a Serverless Distributed File System Depolyed on an Existing Set of Desktop PCs" Proceedings of the International Conference on Measurement and Modeling of Computer Systems pp. 34-43 Jun. 17-21, 2000.
"File system usage in Windows NT 4.0" 17th ACM Symposium on Operating Systems Principles pp. 93-109 Dec. 1999.
Miller et al, "Strong Security for Distributed File Systems", 2001 IEEE, pp. 34-40.
Cheriton, et al., "Decentralizing a Global Naming Service for Improved Performance and Fault Tolerance", (1989) pp. 147-183.
McCue, et al., "Computing Replica Placement in Distributed Systems" IEEE Second Workshop on Replicated Data pp. 58-61 Nov. 1992.
Reich, et al., "S.M.A.R.T. Phase-II". No. WP-9803-001 Maxtor Corporation 3 pages Feb. 1998.
The OceanStore Project web pages http://ocenstore.cs.berkeley.edu/info/overview.html 2 pages last modified Jul. 8, 2002.

* cited by examiner

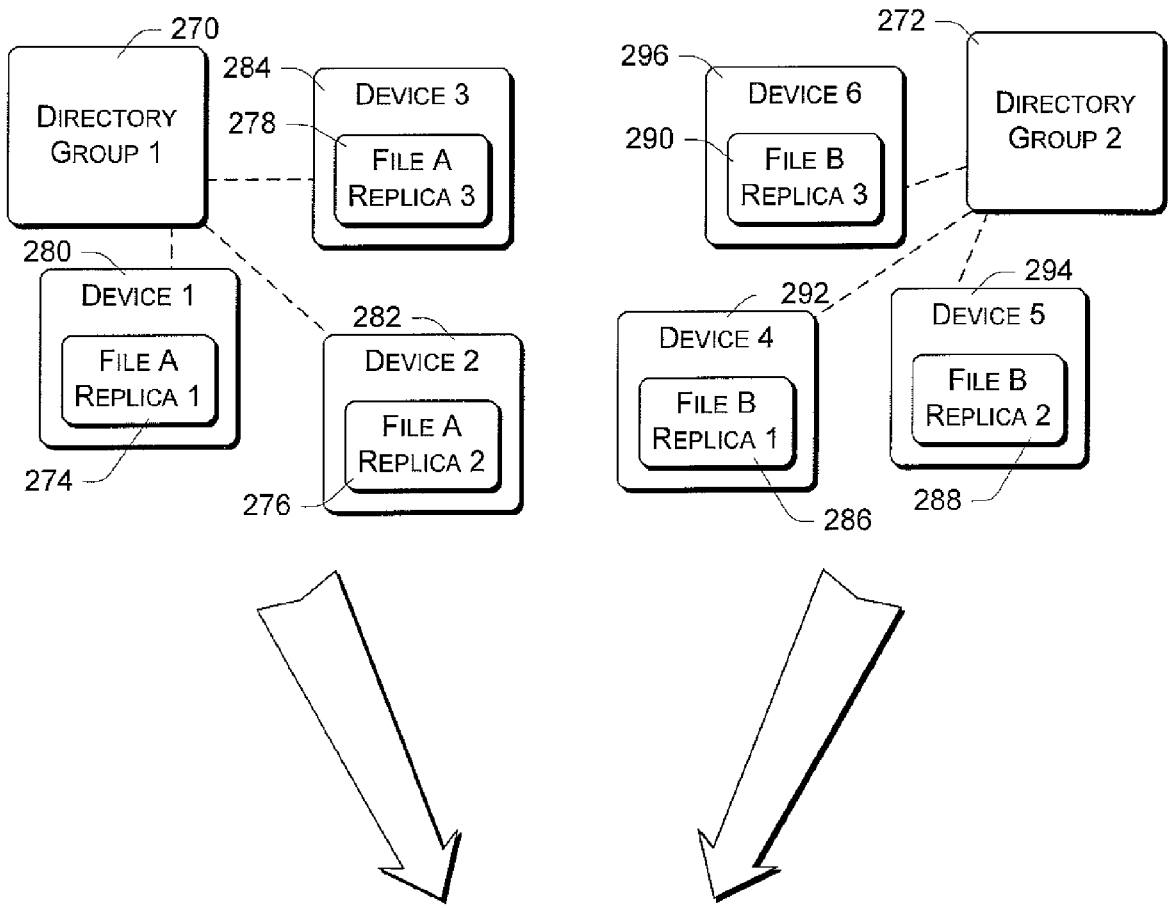

300 → File A Replica 1 ⇄SWAP File B Replica 1 ⟶ File Availability Result
302 → File A Replica 1 ⇄SWAP File B Replica 2 ⟶ File Availability Result
304 → File A Replica 1 ⇄SWAP File B Replica 3 ⟶ File Availability Result
306 → File A Replica 2 ⇄SWAP File B Replica 1 ⟶ File Availability Result
308 → File A Replica 2 ⇄SWAP File B Replica 2 ⟶ File Availability Result
310 → File A Replica 2 ⇄SWAP File B Replica 3 ⟶ File Availability Result
312 → File A Replica 3 ⇄SWAP File B Replica 1 ⟶ File Availability Result
314 → File A Replica 3 ⇄SWAP File B Replica 2 ⟶ File Availability Result
316 → File A Replica 3 ⇄SWAP File B Replica 3 ⟶ File Availability Result

FILE AVAILABILITY IN DISTRIBUTED FILE STORAGE SYSTEMS

RELATED APPLICATIONS

This application is a continuation of U.S. patent application Ser. No. 10/092,994, filed Mar. 7, 2002, now U.S. Pat. No. 7,020,665 which is hereby incorporated by reference herein.

TECHNICAL FIELD

This invention relates to computer networks and file systems, and particularly to improving file availability in distributed file storage systems.

BACKGROUND

File systems manage files and other data objects stored on computer systems. File systems were originally built into the computer operating system to facilitate access to files stored locally on resident storage media. As personal computers became networked, some file storage capabilities were off-loaded from individual user machines to special storage servers that stored large numbers of files on behalf of the user machines. When a file was needed, the user machine simply requested the file from the server. In this server-based architecture, the file system is extended to facilitate management of and access to files stored remotely at the storage server over a network. Today, file storage is migrating toward a distributed file system model in which files are stored on various networked computers, rather than on a central storage server.

One problem that arises in distributed file systems concerns the availability of files stored in the file system. As files are stored on various networked computers, the availability of such files becomes dependent on the availability of the various networked computers, which may not be as great as the availability of a central storage server. One solution to this problem is to store multiple copies of files on different ones of the network computers. However, this solution still leaves the problem of determining which of the network computers the copies of a particular file should be stored on.

The improving file availability in distributed file storage systems described herein solves these and other problems.

SUMMARY

Improving file availability in distributed file storage systems is described herein.

According to one aspect, replicas of a file or other objects are initially placed on different ones of multiple devices using a first process. Subsequently, the placement of the replicas is improved by evaluating whether any replicas of a first file can be swapped with any replicas of a second file without a reduction in the combined file availability of the first and second files, and swapping a replica of the first file with a replica of the second file if the swapping results in no reduction in the combined file availability of the first and second files.

BRIEF DESCRIPTION OF THE DRAWINGS

The same numbers are used throughout the document to reference like components and/or features.

FIG. 5 illustrates an exemplary evaluation of whether replicas of two files can be swapped to improve file availability.

DETAILED DESCRIPTION

The following discussion is directed to improving file availability in distributed file storage systems by improving file replica placement. Multiple copies or "replicas" of a file are stored on different devices in the storage system in order to improve the availability of the file (e.g., if a device on which one replica is stored is not available when retrieval of the file is requested, another replica can be retrieved from another device which is available). When a new file replica needs to be stored, a location for the file replica is determined in accordance with a first process. Subsequently, attempts are made to reposition replicas of the various files in order to improve the combined file availability. As used herein, the combined file availability of a set of files being considered refers to how close to one another the availabilities of the files in the set are. The combined availability of a set (e.g., two) files is thus improved as their file availabilities become closer. By improving the combined file availability of sets of files, the overall file availability in the distributed file storage system is improved.

While the file storage system is described herein in the context of storing "files", it should be noted that other types of storable data can be stored in the file system. The term "file" is used for discussion purposes and is intended to include other objects or essentially any other storage subject matter that may not be commonly characterized as a "file", such as a portion of a file, a group of multiple files, a directory or folder (whether populated with files or unpopulated), and so forth.

Figure 1:
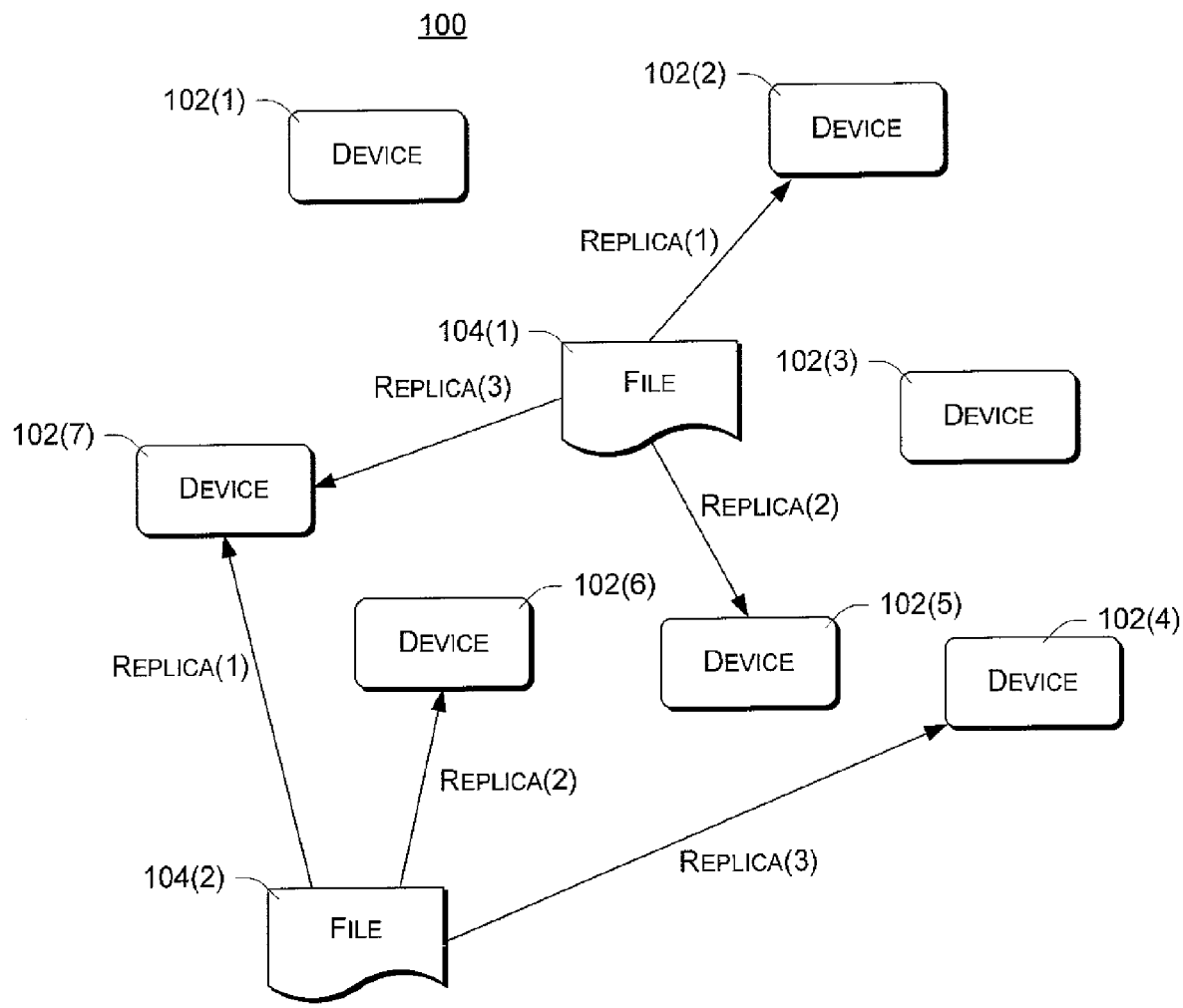
FIG. 1 illustrates an exemplary system including multiple devices and multiple files.

FIG. 1 illustrates an exemplary system 100 including multiple devices 102 and multiple files 104. For ease of explanation only a few devices 102 and two files 104 have been illustrated. It is to be appreciated that system 100 may include any number of devices (e.g., hundreds, thousands, hundreds of thousands, etc.) and any number of files (e.g., tens of thousands, hundreds of thousands, millions, etc.). The devices 102 collectively implement a distributed file system to store files including files 104. Multiple replicas of each file 104 are stored on different devices 102. In the illustrated example, three replicas of each file 104 are stored on devices 102, although larger or smaller numbers of replicas may alternatively be stored.

Determining the location where the file replicas should be stored (that is, on which devices 102 the file replicas should be stored) is a two part process. The first part, referred to as initial placement, determines on which device 102 a particular file replica should be stored when the replica is not currently stored anywhere or its previous storage location is no longer available (in other words, the replica is "homeless"). The second part, referred to as placement improvement, determines whether replicas should be moved to different devices after their initial placement. This two part process is discussed in additional detail below.

Figure 2:
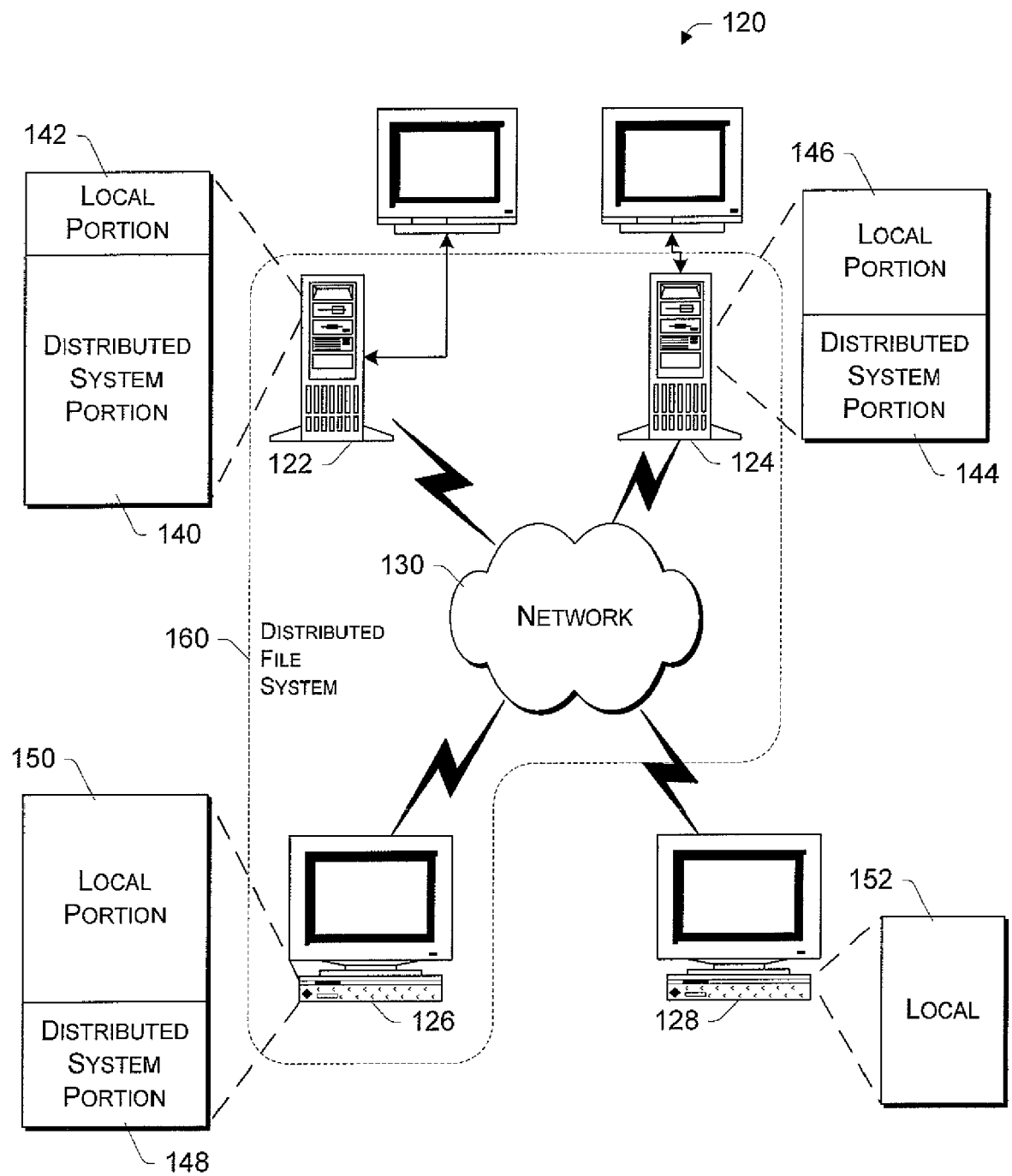
FIG. 2 illustrates an exemplary network environment that supports a serverless distributed file system.

FIG. 2 illustrates an exemplary network environment 120 that supports a serverless distributed file system. Four client computing devices 122, 124, 126, and 128 are coupled together via a data communications network 130. Although four computing devices are illustrated, different numbers (either greater or fewer than four) may be included in network environment 120.

Network 130 represents any of a wide variety of data communications networks. Network 130 may include public portions (e.g., the Internet) as well as private portions (e.g., an internal corporate Local Area Network (LAN)), as well as combinations of public and private portions. Network 130 may be implemented using any one or more of a wide variety of conventional communications media including both wired and wireless media. Any of a wide variety of communications protocols can be used to communicate data via network 130, including both public and proprietary protocols. Examples of such protocols include TCP/IP, IPX/SPX, NetBEUI, etc.

Computing devices 122-128 represent any of a wide range of computing devices, and each device may be the same or different. By way of example, devices 122-128 may be desktop computers, laptop computers, handheld or pocket computers, personal digital assistants (PDAs), cellular phones, Internet appliances, consumer electronics devices, gaming consoles, and so forth.

Two or more of devices 122-128 operate to implement a serverless distributed file system. The actual devices participating in the serverless distributed file system can change over time, allowing new devices to be added to the system and other devices to be removed from the system. Each device 122-126 that implements (participates in) the distributed file system has portions of its mass storage device(s) (e.g., hard disk drive) allocated for use as either local storage or distributed storage. The local storage is used for data that the user desires to store on his or her local machine and not in the distributed file system structure. The distributed storage portion is used for data that the user of the device (or another device) desires to store within the distributed file system structure.

In the illustrated example of FIG. 2, certain devices connected to network 130 have one or more mass storage devices that include both a distributed portion and a local portion. The amount allocated to distributed or local storage varies among the devices. For example, device 122 has a larger percentage allocated for a distributed system portion 140 in comparison to the local portion 142; device 124 includes a distributed system portion 144 that is approximately the same size as the local portion 146; and device 126 has a smaller percentage allocated for a distributed system portion 148 in comparison to the local portion 150. The storage separation into multiple portions may occur on a per storage device basis (e.g., one hard drive is designated for use in the distributed system while another is designated solely for local use), and/or within a single storage device (e.g., part of one hard drive may be designated for use in the distributed system while another part is designated for local use). The amount allocated to distributed or local storage may vary over time. Other devices connected to network 130, such as computing device 128, may not implement any of the distributed file system and thus do not have any of their mass storage device(s) allocated for use by the distributed system. Hence, device 128 has only a local portion 152.

A distributed file system 160 operates to store multiple replicas of files on different computing devices 122-126. When a new file is created by the user of a computer, he or she has the option of storing the file on the local portion of his or her computing device, or alternatively in the distributed file system. If the file is stored in the distributed file system 160, the file will be stored in the distributed system portion of the mass storage device(s) of one or more of devices 122-126. The user creating the file typically has no ability to control which device 122-126 the file is stored on, nor any knowledge of which device 122-126 the file is stored on. Additionally, replicated copies of the file will be saved, allowing the user to subsequently retrieve the file even if one of the computing devices 122-126 on which the file is saved is unavailable (e.g., is powered-down, is malfunctioning, etc.).

The distributed file system 160 is implemented by one or more components on each of the devices 122-126, thereby obviating the need for any centralized server to coordinate the file system. These components operate to determine where particular file replicas are stored, how many replicas of the files are created for storage on different devices, and so forth. Exactly which device will store which files depends on numerous factors, including the number of devices in the distributed file system, the storage space allocated to the file system from each of the devices, how many replicas of the file are to be saved, the number of files already stored on the devices, and so on. The distributed file system 160 does not manage the storage disk (or other mass storage device) directly, but rather relies on existing file systems on local machines, such as those file systems integrated into operating systems (e.g., the Windows NT® file system).

Distributed file system 160 is designed to be scalable to support large numbers of computers within system 160. Protocols and data structures used by the components on the devices in system 160 are designed so as not to be proportional to the number of computers in the system, thereby allowing them to readily scale to large numbers of computers.

The files stored by the file system are distributed among the various devices 122-126 and stored in encrypted form. When a new file is created, the device on which the file is being created encrypts the file prior to communicating the file to other device(s) for storage. The directory entry (which includes the file name) for a new file is also communicated to other device(s) for storage, which need not be (and typically will not be) the same device(s) on which the encrypted file is stored. Additionally, if a new folder or directory is created, the directory entry (which includes the folder name or directory name) is also communicated to the other device(s) for storage. As used herein, a directory entry refers to any entry that can be added to a file system directory, including both file names and directory (or folder) names.

Each directory entry includes the name of the corresponding file, an identification of the computers at which replicas of the file are stored, and file verification data that allows the contents of the file to be verified as corresponding to the directory entry. The file verification data can take a variety of different forms, and in one implementation is a hash value generated by applying a cryptographically secure hash function to the file, such as MD5 (Message Digest 5), SHA-1 (Secure Hash Algorithm-1), etc. When a file is retrieved from storage, the retrieving computer can re-generate the hash value and compare it to the hash value in the directory entry to verify that the computer received the correct file. In another implementation, the file verification data is a combination of: a file identification number (e.g., a unique identifier of the file), a file version number, and the name of the user whose signature is on the file.

Directories are maintained in distributed file system 160 by groups of computers organized into directory groups. In one implementation, each directory group is a Byzantine-fault-tolerant group, which is a group of computers that can be used to store information and/or perform other actions even though a certain number of those computers are faulty (compromised or otherwise unavailable). A computer can be compromised in a variety of different manners, such as a malicious user operating the computer, a malicious program running on the computer, etc. Any type of behavior can be observed from a compromised computer, such as refusing to respond to requests, intentionally responding to requests with incorrect or garbage information, etc. The Byzantine-fault-tolerant group is able to accurately store information and/or perform other actions despite the presence of such compromised computers. Byzantine groups are well-known to those skilled in the art, and thus will not be discussed further except as they pertain to the present invention.

The distributed file system 160 is designed to prevent unauthorized users from reading data stored on one of the devices 122-126. Thus, a file created by device 122 and stored on device 124 is not readable by the user of device 124 (unless he or she is authorized to do so). In order to implement such security, the contents of files as well as all file and directory names in directory entries are encrypted, and only authorized users are given the decryption key. Thus, although device 124 may store a file created by device 122, if the user of device 124 is not an authorized user of the file, the user of device 124 cannot decrypt (and thus cannot read) either the contents of the file or the file name in its directory entry.

Generally, the process for storing a file in serverless distributed file system 160 is as follows. Initially, a new file storage request is received at a client computing device. The client encrypts the file and the file name and generates a file contents hash. The client sends the encrypted file name and file contents hash to the appropriate Byzantine-fault-tolerant directory group along with a request to create a directory entry. The directory group validates the request, such as by verifying that the file name does not conflict with an existing name and that the client has permission to do what it is requesting to do. If the request is not validated then the request fails. However, if the request is validated, then the directory group generates a directory entry for the new file. The directory group also generates the replicas for the file, determines the placement for the replica, and saves the replicas to the proper computers, and updates the directory entry for the file accordingly.

Every computer 122-126 in distributed file system 160 can have three functions: it can be a client for a local user, it can be a repository for encrypted copies of files stored in the system, and it can be a member of a group of computers that maintain one or more directories (that is, a member of a directory group). A computer 122-126 may perform any one or more of these three functions, and which function(s) a computer performs may change over time.

Figure 3:
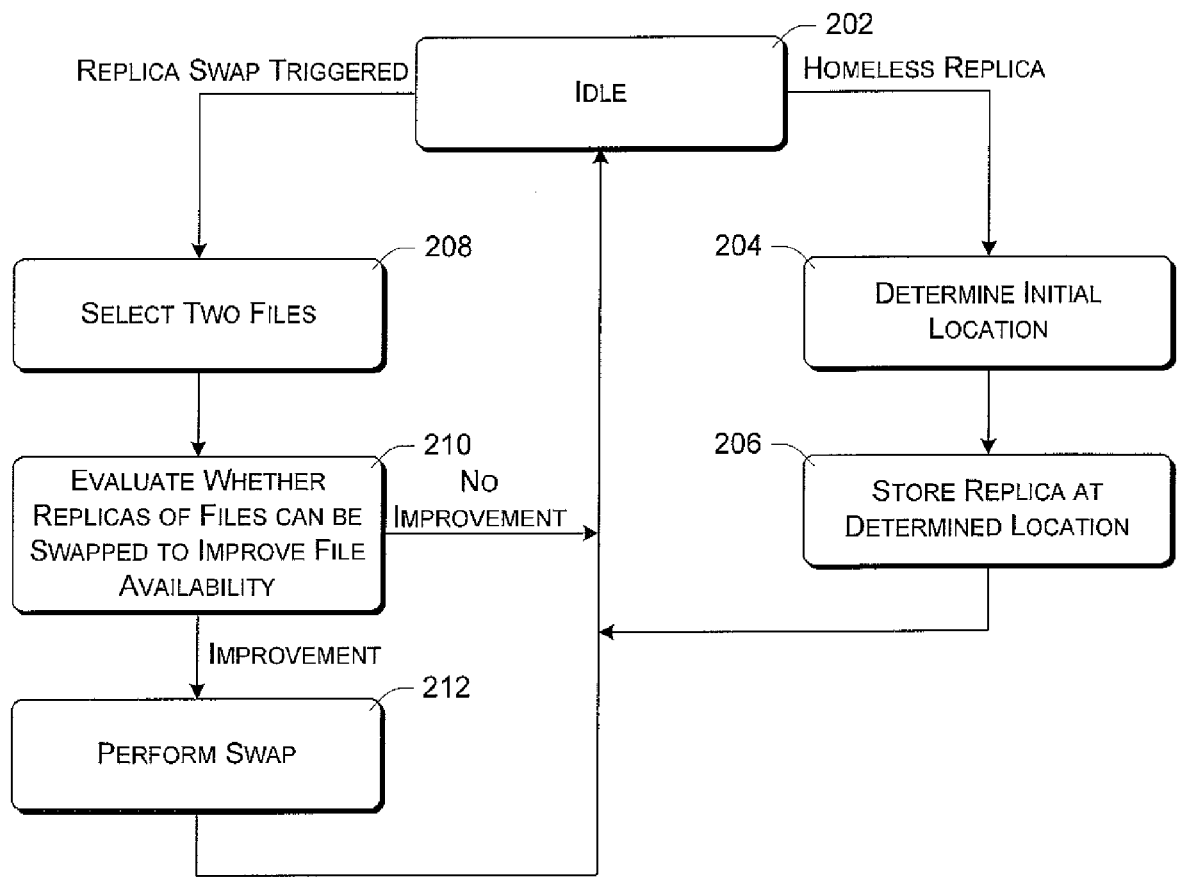
FIG. 3 is a flowchart illustrating an exemplary process for placing file replicas in a system.

FIG. 3 is a flowchart illustrating an exemplary process 200 for placing file replicas in a system. Process 200 is implemented by one or more devices responsible for maintaining one or more directories. Process 200 is idle (act 202) until one of two events occurs—a homeless replica needs placement, or a replica swap is triggered. When a homeless replica exists, the homeless replica needs placement and an initial placement part of process 200 is invoked. A replica may be homeless for a variety of different reasons, such as creation of a new file, a device previously storing a replica is removed from the system (e.g., to no longer be part of distributed file system 160 of FIG. 2, or because it has broken), a replica was evicted from a device because space was needed on the device for local storage, the number of replicas for the file has increased, and so forth. An initial location for the new replica is determined (act 204) and the replica is stored at the determined location (act 206).

In one implementation, the initial location is determined in act 204 by randomly selecting a device. The random selection may be based on a truly random function or alternatively a pseudo-random function. The set of devices from which the random selection is made may be all devices in the system (e.g., the devices of distributed file system 160 of FIG. 2), or alternatively fewer devices (e.g., only those devices in the system that the device(s) implementing the process 200 is aware of).

Alternatively, the determination in act 204 may be made in other manners, such as by selecting the device that has the highest device availability (or one of the highest device availabilities), selecting the device that has the lowest device availability (or one of the lowest device availabilities), selecting the device with the largest amount (or one of the largest amounts) of available space for file storage, selecting the device with the smallest amount (or one of the smallest amounts) of available space for file storage, selecting the newest device (or one of the newest devices), selecting the oldest device (or one of the oldest devices), and so forth. In yet another alternative, the determination in act 204 is made by assigning an order according to some criteria (e.g., randomly, by IP address, alphabetically by name, etc.) to a set of devices on which replicas may be stored and, each time a new replica is to be stored selecting the next device in accordance with this order.

Various other factors may also be considered in making the determination of act 204, regardless of whether the device selection is random or otherwise. For example, if the selected device does not currently have sufficient space to store the replica then another device is selected (e.g., according to the same criteria as the originally selected device but ignoring the originally selected device). By way of another example, if the selected device is not currently available (e.g., is malfunctioning, turned off, etc.) then another device is selected, or alternatively if the device is not currently available then it may not be included as a device in the set of devices from which the selection is made. By way of yet another example, if the selected device is owned by the same person/entity as another device on which another replica of the same file is already stored then another device is selected, or alternatively such a commonly-owned device may not be included as a device in the set of devices form which the selection is made.

Once the homeless replica is initially placed, process 200 returns to idle (act 202). Given the manner in which the initial placement is determined (e.g., randomly), it is often likely that file availability in the system can be improved by relocating the initially placed replica. Thus, a placement improvement part of the process is invoked when a replica swap is triggered. Once a replica swap is triggered, two files are selected (act 208). An evaluation is then made as to whether replicas of the files can be swapped with one another in order to improve the combined file availability of the selected files (act 210). If the combined file availability of the selected files cannot be improved, then process 200 returns to idle (act 202). However, if the combined file availability of the selected files can be improved (or at least not reduced), then replicas of the files are swapped, thereby improving the combined file availability (act 212). Process 200 then returns to idle (act 202).

The combined file availability of the two files can be improved if swapping any replica of the one file with any replica of the other file brings the availabilities of the two files closer together. It is to be appreciated that, by bringing the availabilities of the two files closer together, situations can arise where the availability of one file is increased while the availability of the other file is decreased.

A replica swap can be triggered, and the file placement improvement portion of process 200 invoked, in a variety of circumstances. In one implementation, the replica swap is triggered at regular or irregular intervals (e.g., once every 200 milliseconds). Alternatively, the file system may be configured so that the file placement improvement portion of process 200 does not consume more than a particular amount (e.g., 1%) of resources (e.g., of network bandwidth, processor utilization, disk access time, combinations thereof, etc.). The factors which go into triggering the file placement improvement portion of process 200 may be static (e.g., preprogrammed into the system) or alternatively dynamic (e.g., an interval between triggers may be increased at times where the file system is not being used very heavily, or the amount of resources to be consumed by the file placement improvement process may be increased if the combined file availability of all (or a threshold number) of files in the file system becomes too low, etc.).

The replica swap may be triggered by one or more devices in the file storage system that are responsible for maintaining files in the system, or alternatively some other device or devices. For example, there may be a device in the file system with the responsibility for monitoring and/or managing the combined performance of the file system, and this device is responsible for triggering the replica swap.

Figure 4:
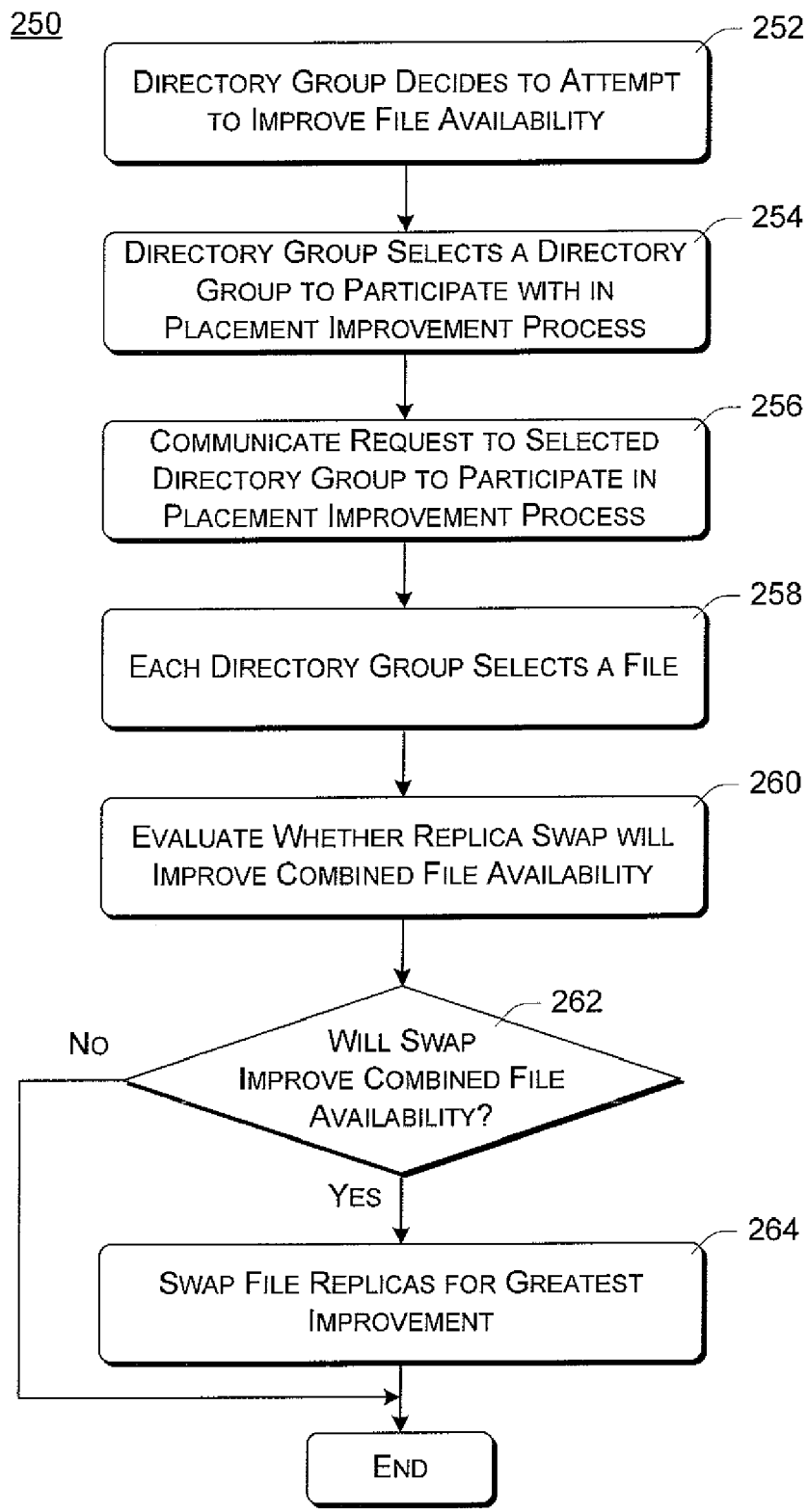
FIG. 4 is a flowchart illustrating an exemplary file placement improvement process.

FIG. 4 is a flowchart illustrating an exemplary file placement improvement process 250. The file placement improvement process 250 is, in accordance with one implementation, a more detailed description of acts 208-212 of FIG. 3. The process 205 is discussed with reference to FIG. 5 as well.

In the illustrated examples of FIGS. 4 and 5, a hierarchical file storage structure is employed that includes one or more namespace roots each capable of supporting one or more subtrees of directories or folders, and with each subtree being capable of supporting one or more additional subtrees. A directory can be viewed as a simulated file folder, being capable of holding zero or more files and/or zero or more other directories. A subtree refers to one or more directories and includes a root (it may also include a namespace root), and has the property that the path from the subtree root to all members of the subtree is within the subtree itself.

Each subtree is managed or maintained by a group of one or more devices referred to as a directory group. A directory group can manage a subtree or alternatively an arbitrary set of directories within the namespace. One or more modules of the group of devices are responsible for implementing directory services to manage the subtree(s) assigned to the directory group, including all files in the subtree(s). In situations where the directory group is made up of multiple devices, those devices operate collectively to manage the subtree(s) assigned to the directory group. In one implementation, directory groups can create new directory groups and assign subtree(s) to these new groups, thereby alleviating some of the management responsibilities of the creating group. Alternatively, the ability to create new directory groups and assign subtree(s) to those directory groups may be restricted to only certain devices.

FIG. 5 illustrates two exemplary directory groups 270 and 272. Although a file system may typically include additional directory groups, only two directory groups have been illustrated in FIG. 5 for ease of explanation and in order to avoid cluttering the drawings. Initially, in FIG. 4, a directory group decides to attempt to improve file availability in the file system (act 252). This decision to attempt to improve file availability may be made by the device or devices managing the directory group, or alternatively some other device as discussed above. The directory group selects a directory group with which to participate in the placement improvement process (act 254). The selection in act 254 may be performed randomly or alternatively in some other manner. For example, a device managing the directory group may keep track of all other devices in the file system managing different directory groups, and have an ordering associated with those other devices or directory groups and select in act 254, devices or directory groups in that order. The directory group selected in act 254 may be a different directory group than the group that made the decision in act 252, or alternatively the same group. In other words, a directory group may participate with itself in the placement improvement process.

For purposes of explanation, assume that two different directory groups are participating in the placement improvement process, directory groups 270 and 272 of FIG. 5. As illustrated in FIG. 5, directory group 270 is responsible for managing storage of a file A that has three replicas 274, 276, and 278, stored on three devices 280, 282, and 284, respectively. Additionally, directory group 272 is responsible for managing storage of a file B that has three replicas 286, 288, and 290, stored on three devices 292, 294, and 296, respectively. Although each directory group 270 and 272 is typically responsible for managing storage of additional files, these additional files have not been illustrated in FIG. 5 so as to avoid cluttering the drawings. Additionally, it should be noted that multiple directory groups can store files to the same device.

Returning to FIG. 4, the directory group (e.g., directory group 270) communicates a request to the directory group selected in act 254 (e.g., directory group 272) to participate in the placement improvement process (act 256). Each of the directory groups 270 and 272 selects a file for the placement improvement process (act 258). Each directory group 270 and 272 selects a file in act 258 in accordance with any of a wide variety of processes. In one implementation, each directory group 270 and 272 selects a file that they manage randomly in act 258. In an alternate implementation, one of the directory groups selects, from all the files that it manages, the file with the lowest availability (or one of the lowest availabilities) while the other directory group selects a file at random. In yet another alternate implementations, one of the directory group selects, from all the files that it manages, the file with the lowest availability (or one of the lowest availabilities) while the other directory group selects, from all the files that it manages, the file with the highest availability (or one of the highest availabilities). For example, the directory group initiating the attempt in act 252 may select the file that it manages with the lowest availability while the selected directory group may randomly select a file that it manages. Alternatively, other file selection processes may be used, such as biased random selection, in which one directory group selects a file randomly but with a bias towards low-availability files, or in which one directory group selects a file randomly but with a bias toward high-availability files. Such a bias could involve weighting factors, cutoff availability thresholds, or other means.

For purposes of explanation, assume that, in act 258, directory group 270 selects file A, and directory group 272 selects file B. Directory groups 270 and 272 then evaluate whether a replica swap will improve the combined file availability of the selected files (act 260). The evaluation of act 260 may be performed by directory group 270, directory group 272, or by both directory groups. The evaluation may also involve communicating information (such as file availability or machine availability) from one directory group to another.

The evaluation of act 260 may involve considering all possible replica exchanges for the two files and checking whether any of them improve the combined file availability of the selected files. These swaps or exchanges refer to swapping the devices on which the replicas are stored. In the illustrated example of FIG. 5, a swap of replica 274 with replica 286 is evaluated, and a file availability resulting from the considered swap 300 is determined. The resulting file availability refers to the file availability of file A and the file availability of file B after the replica swap. The remaining possible replica exchanges for the two files are illustrated as 302-316, each having a file availability resulting from the swap.

A check is then made as to whether swapping any of the replicas of the selected files will improve (or at least not reduce) the combined file availability of the selected files (act 262). This check is made by comparing the file availability results that would result from swapping the various replicas (300-316) to the file availabilities of file A and file B if no replicas are swapped. If the file availability results from any of the swappings (300-316) bring the file availabilities of file A and file B closer than they were without performing any swapping, then a swap will improve combined file availability between the two files; otherwise, a swap will not improve combined file availability between the two files.

If a swap will not improve combined file availability between two the files, then the process 250 ends. However, if a swap will improve combined file availability (or at least not reduce combined file availability) between the two files, then a file replica swap (300-316) which results in the greatest improvement of combined file availability between the two files (brings the file availabilities of the two files closest together) is performed (act 264). In one implementation, only one set of replicas is swapped. Alternatively, depending on the number of replicas and the file availabilities, multiple swaps may be evaluated in act 260 and performed in act 264 (that is, two or more sets of replicas may be swapped).

The swap is performed by the directory group(s) communicating requests to the devices storing the replicas to be swapped to each transfer their replica to the other (and delete their copy of the replica after it has been transferred). Any necessary updates are also made in the directory group (e.g., the directory entries are updated to reflect which devices store replicas of which files after the swap).

In one implementation, the evaluation of act 260 can be performed without actually swapping the files. That is, file availabilities resulting from the swaps can be calculated without actually moving replicas between devices. Alternatively, different evaluation methodologies may be used that do require actual swapping of the files.

The availability of a file is a function of the availability of the devices on which replicas of the file are stored. The availability of a device can be calculated in a variety of different manners. In one implementation, the availability of a device refers to how often the device is available to (accessible by) other devices in the file system. Thus, for example, the device is available if it is running, is coupled to the network, and is functioning correctly. If the device is not running (for example, has been turned off), is not coupled to the network, has experienced a software and/or hardware crash, etc., the device is not available.

In one implementation, each directory group calculates the availability of each device on which a replica of a file managed by the directory group is stored. The directory group sends, at regular or irregular intervals, a communication or request that requires the other device to respond. The communication or request sent to the other device can take any of a wide variety of forms, such as a conventional "pinging" of the other device. If a response is received from the other device, then the other device is determined to be available at that time. If a response is not received from the other device, then the other device is determined to be not available at that time. Based on these determinations of available and not available, the device availability can be readily calculated.

The availability of a file is then calculated by considering the availability of each device on which a replica of the file is stored. For each device on which a replica of the file is stored, a value is generated that reflects the availability of the device. In one implementation, this value is generated by taking the negative logarithm of the fraction of time that the device is not available. This value then reflects the number of "nines" in the decimal expansion of the available time for the device. For example, if a device is available 99% of the time, it is not available 1% or 0.01 of the time. The negative logarithm of 0.01 is 2 (i.e., $-\log(0.01)=2$), which is the number of nines in the fraction of time the device is available (i.e., two nines).

Once this value is calculated for each device on which a replica of the file is stored, the values calculated for the devices can be combined by summing the values. This sum is the availability of the file. By way of example, assume that device 280 of FIG. 5 is available 99% of the time, device 282 is available 90% of the time, and device 284 is available 43% of the time. The availability of file A would be 3.24 (2+1+0.24). Thus, it can be seen that the file availabilities can be calculated based on the device availabilities without having to actually copy replicas between devices.

Table I below illustrates example availabilities of file A and file B for the various swaps (300-316), assuming device 280 is available 99% of the time (with $-\log(0.01)=2$), device 282 is available 90% of the time (with $-\log(0.1)=1$), device 284 available 45% of the time (with $-\log(0.55)=0.26$), device 292 is available 99.9% of the time (with $-\log(0.001)=3$), device 294 is available 99.99% of the time (with $-\log(0.0001)=4$), and device 296 is available 84% of the time (with $-\log(0.16)=0.8$). The absolute value of the difference between these file availabilities is also shown in Table I.

TABLE I

| Swap | File A Availability | File B Availability | Absolute Difference |
|---|---|---|---|
| 300 | 4.26 | 6.80 | 2.54 |
| 302 | 5.26 | 5.80 | 0.54 |
| 304 | 2.06 | 9.00 | 6.94 |
| 306 | 5.26 | 5.80 | 0.54 |
| 308 | 6.26 | 4.80 | 1.46 |
| 310 | 3.06 | 8.00 | 4.94 |
| 312 | 6.00 | 5.06 | 0.94 |
| 314 | 7.00 | 4.06 | 2.94 |
| 316 | 3.80 | 7.26 | 3.46 |

The original file availability for file A (without swapping any replicas) is 3.26, and the original file availability for file B (without swapping any replicas) is 7.80. Multiple swaps 300-316 could result in an improved combined file availability between the two files—the absolute difference between the original file availability for file A and file B is 4.54, so any swap that results in an absolute difference less than 4.54 is an improvement (i.e., swaps 300, 302, 306, 308, 312, 314, and 316). Swaps 304 and 310 both reduce file availability. The greatest improvement of swaps 300-316 is from swaps 302 and 306, each of which result in file availabilities for file A and file B having an absolute difference of 0.54. One of these swaps is selected (e.g., randomly) in act 264 and performed.

Various other factors may also be considered in making the determination of which (if any) of swaps 300-316 to perform. For example, there may be insufficient storage space on one of the files to store a particular replica, in which case a swap will not be performed that involves storing a replica to a device having insufficient storage space (e.g., if the replicas of file A are much larger than the replicas of file B, one of the devices 292, 294, or 296 may not have sufficient storage space to store a replica of file A). By way of another example, it may be desirable to not have replicas of the same file stored on devices owned by the same person/entity, in which case a swap will not be performed that involves storing a replica of a file to a device owned by a person/entity that already has a replica of the file stored thereon.

In the examples above, the files have the same number of replicas. Alternatively, different files may have different numbers of replicas. By way of another example, the file system may be configured to have an overall replication factor of 3.5, so roughly half of the files would have three replicas each and roughly half of the files would have four replicas each.

Thus, it can be seen that modules and techniques described herein are readily scalable as they are not dependent on the overall number of devices in the file system (rather, the directory groups initially place and subsequently swap replicas based on devices storing replicas of files maintained by the directory groups not all devices in the system). Additionally, the modules and techniques described herein operate in a distributed manner without the need for a central control to coordinate either initial replica placement or subsequent placement improvement. Furthermore, the modules and techniques described herein operate in an iterative manner, allowing changes to be made swap-by-swap rather than requiring placement decisions for all replicas in the file system to be made at a single time. This further allows the placement to be adaptive to changes in the file system, such as addition or removal of devices, increases or decreases in the number of replicas for a file(s), and so forth.

Figure 6:
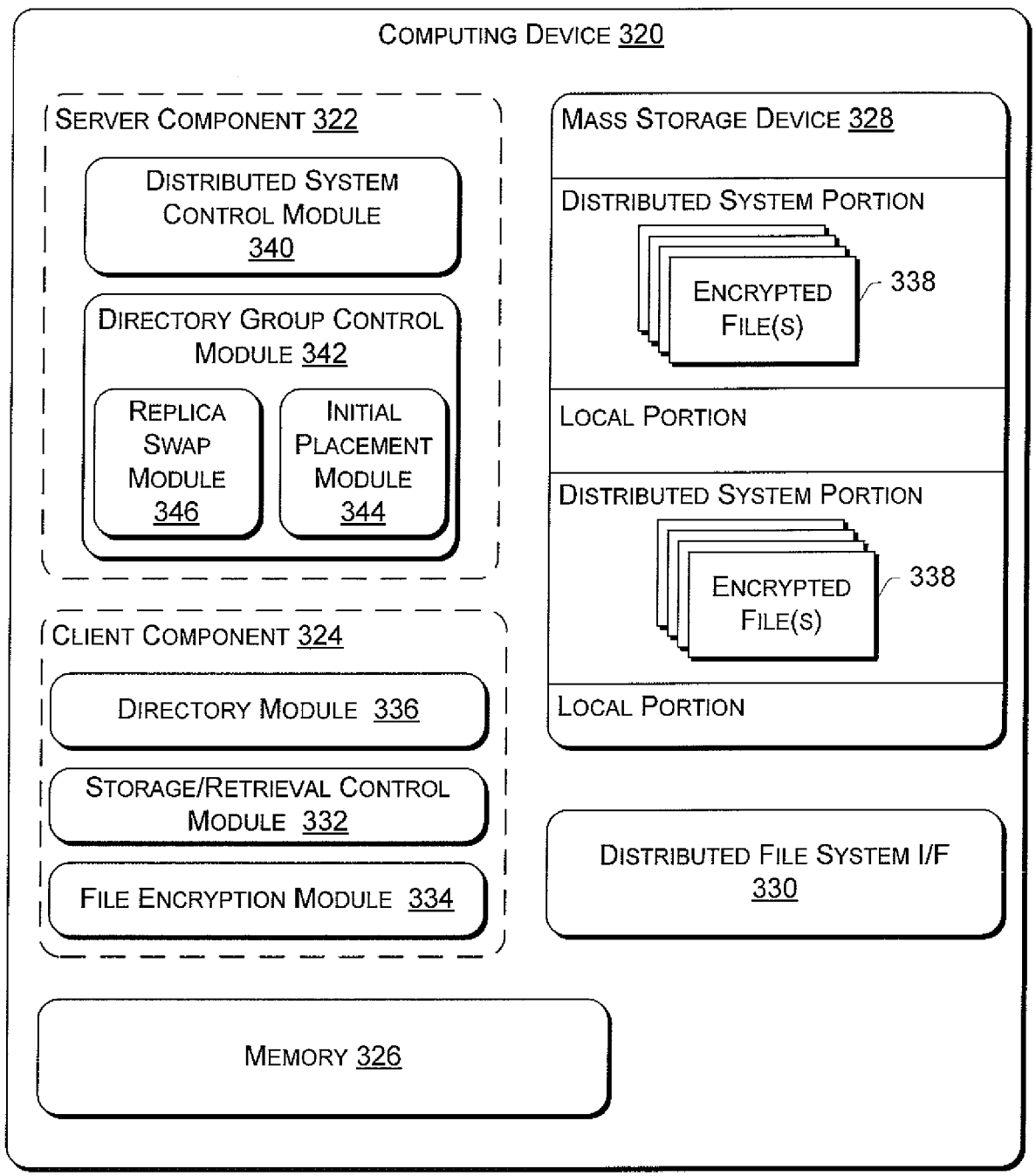
FIG. 6 illustrates logical components of an exemplary computing device.

FIG. 6 illustrates logical components of an exemplary computing device 320 that is representative of any one of the devices 102 of FIG. 1, devices 122-126 of FIG. 2 that participate in the distributed file system 160, or devices 280, 282, 284, 292, 294, or 296 of FIG. 5. Computing device 320 includes a server component 322, a client component 324, a memory 326, a mass storage device 328, and a distributed file system interface 330. Computing device 320 also typically includes additional components (e.g., a processor), however these additional components have not been shown in FIG. 6 so as not to clutter the drawings. A more general description of a computer architecture with various hardware and software components is described below with reference to FIG. 7.

Memory 326 can be any of a wide variety of conventional volatile and/or nonvolatle memories, such as RAM, ROM, Flash memory, and so on. Mass storage device 328 can be any of a wide variety of conventional nonvolatile storage devices, such as a magnetic disk, optical disk, Flash memory, and so forth. Mass storage device 328 is partitioned into a distributed system portion and a local portion. Although only one mass storage device 328 is illustrated in FIG. 6, computing device 320 may include multiple storage devices 328 (of different types, or alternatively all of the same type).

Computing device 320 is intended to be used in a serverless distributed file system, and as such includes both a server component 322 and client component 324. Server component 322 handles requests when device 320 is responding to a request involving a file or directory entry stored (or to be stored) in storage device 328, while client component 324 handles the issuance of requests by device 320 for files or directories stored (or to be stored) in the distributed file system. Client component 324 and server component 322 operate independently of one another. Thus, situations can arise where the serverless distributed file system 160 causes files being stored by client component 324 to be stored in mass storage device 328 by server component 322.

Client component 324 includes a storage and retrieval control module 332, which along with interface 330, manages access to the serverless distributed file system 160 for the creation, storage, retrieval, reading, writing, modifying, and verifying of files and directories on behalf of computing device 320. Control module 332 uses a file encryption module 334 to encrypt files and a directory encryption module 336 to encrypt file and directory names in directory entries.

The server component 322 includes a distributed system control module 340 that manages access to the encrypted files 338. It communicates with mass storage device 328 to store and retrieve encrypted files 338. Distributed system control module 340 also maintains a record of the directory entries (not shown) in memory 326 and/or mass storage device 328 that are stored at computing device 320 (or alternatively that are stored elsewhere in the serverless distributed file system).

In situations where computing device 320 manages a directory group, server component 322 also includes a directory group control module 342. Directory group control module 342 manages the various subtrees that computing device 320 is responsible for, and also includes an initial placement module 344 and a replica swap module 346. Initial placement module 344 determines the initial placement for new replicas as discussed above, while replica swap module 346 performs the placement improvement process as discussed above.

In the discussions above, reference is made to files being encrypted. In some systems, files are encrypted prior to being replicated and thus the replicas being placed in the discussions above are encrypted. In other systems, however, the files need not be encrypted prior to being replicated and un-encrypted replicas are placed by the above-described modules and techniques.

Figure 7:
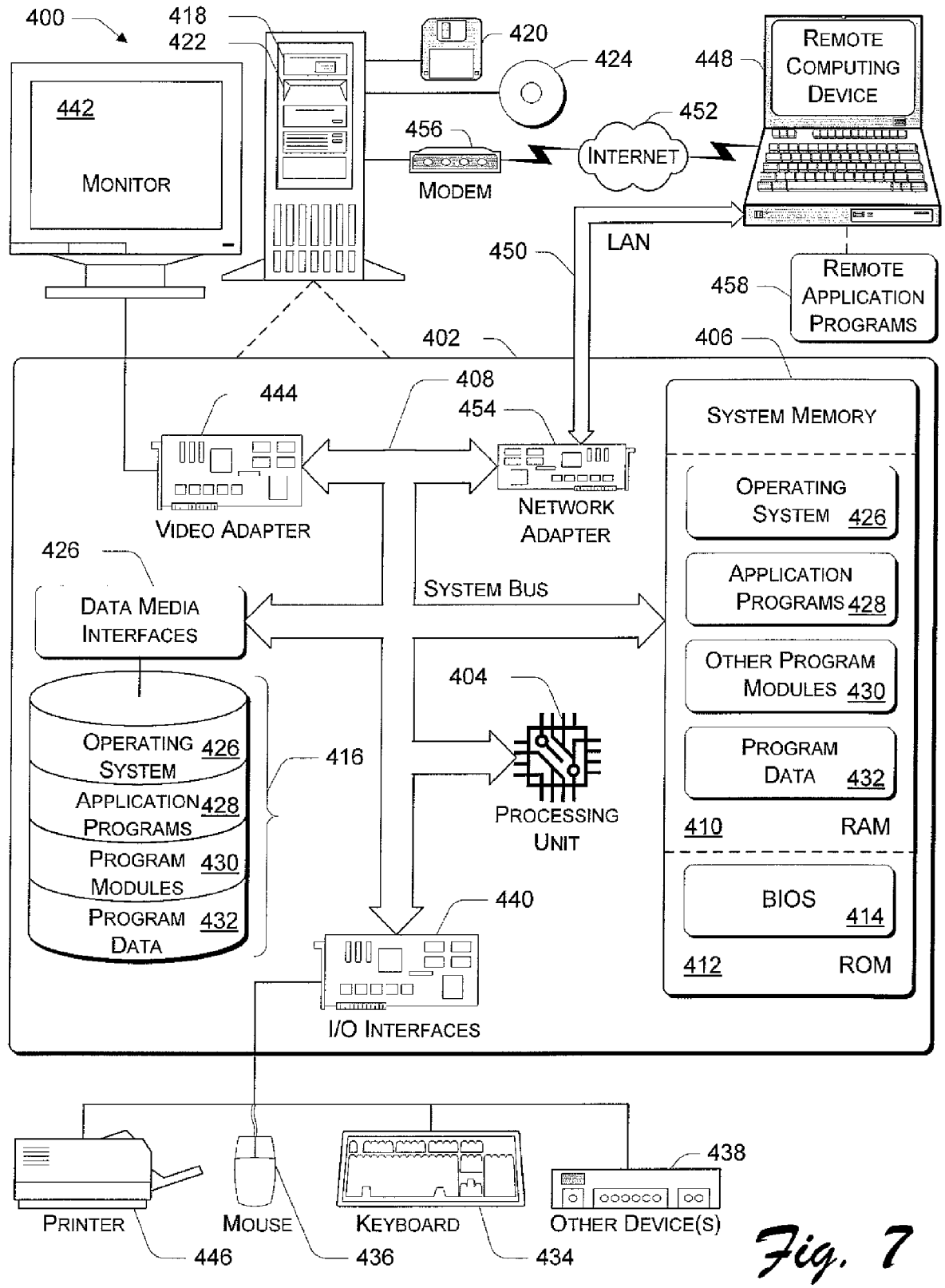
FIG. 7 illustrates a more general computer environment.

FIG. 7 illustrates a more general computer environment 400. The computer environment 400 is only one example of a computing environment and is not intended to suggest any limitation as to the scope of use or functionality of the computer and network architectures. Neither should the computer environment 400 be interpreted as having any requirement regarding the inclusion (or exclusion) of any components or the coupling or combination of components illustrated in the exemplary computer environment 400.

Computer environment 400 includes a general-purpose computing device in the form of a computer 402. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 7 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is a illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with FIG. 2, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer By way of example, and not limitation, computer readable media may comprise "computer storage media" and "communications media."

"Computer storage media" include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method for determining location to store object replicas, the method comprising:
   receiving an indication of a homeless replica of an object, wherein the object has a plurality of replicas including the homeless replica;
   determining an initial placement for the homeless replica, wherein the initial placement is one of a plurality of devices in a system;
   evaluating, on an object by object basis, whether any replicas of the object can be swapped with one of a plurality of replicas of an other object and not reduce a combined object availability of the two objects, wherein the evaluating comprises determining, for each possible swapping of replicas of objects, an object availability for each object, and checking whether any of the possible swappings result in a combined object availability of two objects that is greater than other combined object availability prior to the evaluating; and
   swapping a replica of the object with the one of the plurality of replicas of the other object, wherein the swapping is based on the evaluating and performed only if the swapping does not reduce the combined object availability of the two objects, wherein the replica of the object is stored on a first computing device and wherein the swapping the replicas comprises moving the replica of the object to a second computing device, storing the moved replica of the object in the second computing device and moving the one of the plurality of replicas of the other object to the first computing device, wherein the swapping results in decreasing an availability of the object and increasing an availability of the other object.

2. A method as recited in claim 1, wherein the object comprises a file.

3. A method as recited in claim 1, wherein the object comprises a plurality of files.

4. A method as recited in claim 1, wherein the object comprises a portion of a file.

5. A method as recited in claim 1, wherein the object comprises a directory.

6. A method as recited in claim 1, implemented by a computing device and further comprising selecting, prior to the evaluating, as the object one of a plurality of objects that the computing device is responsible for maintaining.

7. A method as recited in claim 6, wherein the selecting comprises selecting the one of the plurality of objects that has lowest object availability.

8. One or more computer readable storage media having stored thereon a plurality of instructions that, when executed by one or more processors of a computing device, causes the one or more processors to perform acts comprising:
   working, in conjunction with one or more other processors of by other computing device, to determine whether a replica of a file managed by the computing device and a replica of an other file managed by the other computing device can be swapped with one another to bring an availability of the file and an availability of the other file closer, wherein said working comprises determining, for the replicas, an availability for each replica and checking whether the swapping results in a combined availability of two replicas that is greater than other combined availability if the files were not to be swapped; and
   swapping the replica of the file and the replica of the other file only if the swapping brings the availability of the file and the availability of the other file closer, wherein said swapping comprises communicating with a first device on which the replica of the file is stored and a second device on which the replica of the other file is stored to have the first device transfer the replica of the file to the second device and delete the replica of the file on the first device, and to have the second device transfer the replica of the other file to the first device and delete the replica of the other file on the second device, wherein the swapping results in decreasing an availability of the replica of the file and increasing the availability of the replica of the other file.

9. One or more computer readable storage media as recited in claim 8, wherein the plurality of instructions further cause the one or more processors to perform acts comprising:
  receiving an indication of a homeless replica of the file; and
  determining an initial placement, on one of a plurality of additional computing devices, for the homeless replica.

10. One or more computer readable storage media as recited in claim 9, wherein the plurality of additional computing devices exclude any computing device on which a replica of the file is already stored.

11. One or more computer readable storage media as recited in claim 8, wherein the file is selected randomly from a plurality of files managed by the computing device, and wherein the other file is selected randomly from another plurality of files managed by the other computing device.

12. One or more computer readable storage media as recited in claim 8, wherein the one or more processors of a computing device and the one or more other processors of another computing device are the same processors of a same computing device.

* * * * *